United States Patent [19]
Leone et al.

[11] Patent Number: 5,724,468
[45] Date of Patent: Mar. 3, 1998

[54] ELECTRONIC BACKPLANE DEVICE FOR A FIBER DISTRIBUTION SHELF IN AN OPTICAL FIBER ADMINISTRATION SYSTEM

[75] Inventors: Frank Salvatore Leone, Berkeley Heights; William Joseph Parzygnat, Morris Township, Morris County; Richard Joseph Pimpinella, Hampton; Randy Alan Reagan, Morris Plains, all of N.J.

[73] Assignee: Lucent Technologies Inc., Murray Hill, N.J.

[21] Appl. No.: 709,939

[22] Filed: Sep. 9, 1996

[51] Int. Cl.$^6$ ................................................ G02B 06/36
[52] U.S. Cl. ................................. 385/134; 385/135
[58] Field of Search .............................. 385/134, 135, 385/147, 24

[56] References Cited

U.S. PATENT DOCUMENTS

| | | | |
|---|---|---|---|
| 5,090,792 | 2/1992 | Koht et al. | 385/135 |
| 5,204,925 | 4/1993 | Bonanni et al. | 385/89 |
| 5,442,725 | 8/1995 | Peng | 385/135 |
| 5,448,675 | 9/1995 | Leone et al. | 385/135 |
| 5,461,693 | 10/1995 | Pimpinella | 385/135 |
| 5,513,293 | 4/1996 | Holland et al. | 385/135 |

*Primary Examiner*—John Ngo

[57] ABSTRACT

An electrical backplane assembly for interconnecting a plurality of connection modules in a fiber distribution shelf to the central controller of an optical fiber administration system. The electrical backplane assembly mounts upon a bracket assembly within the confines of the shelf structure of the fiber distribution shelf. The bracket assembly retains the electrical backplane assembly in a small previously unused area of space in between the tops of the connection modules and the interior top panel of the fiber distribution shelf. By having the electrical backplane assembly entirely contained within the shelf structure of a fiber distribution shelf, a unique configuration is provided that greatly reduces the size and complexity of the overall fiber administration system.

20 Claims, 4 Drawing Sheets

ELECTRONIC BACKPLANE DEVICE FOR A FIBER DISTRIBUTION SHELF IN AN OPTICAL FIBER ADMINISTRATION SYSTEM

RELATED APPLICATIONS

This application is related to the following:

U.S. patent application Ser. No. 08/709,943, entitled OPTICAL SWITCHING APPARATUS AND METHOD FOR USE IN THE CONSTRUCTION MODE TESTING OF A MODULAR FIBER ADMINISTRATION SYSTEM, filed, Sep. 9, 1996;

U.S. patent application Ser. No. 08/645,108, entitled AN OPTICAL COMMUNICATIONS SYSTEM HAVING DISTRIBUTED INTELLIGENCE, filed, May 13, 1996;

U.S. patent application Ser. No. 08/709,978, entitled FIBER OPTIC OPERATION CENTER, filed Sep. 9, 1996;

U.S. patent application Ser. No. 08/709,977, entitled OPTICAL MONITORING AND TESTING MODULE, filed Sep. 9, 1996; and U.S. patent application Ser. No. 08/713,576, entitled OPTICAL FIBER DISTRIBUTION SHELF ASSEMBLY CONTAINING A MODULAR OPTICAL SWITCH, filed Sep. 9, 1996.

All of the above listed patents are assigned to Lucent technologies, the assignee herein. These applications are incorporated into this disclosure by reference.

BACKGROUND OF THE INVENTION

1. Field of the Invention

The present invention relates to electronic assemblies used to power and control connection modules contained within a fiber distribution shelf of an optical fiber administration system. More particularly, the present invention relates to the physical structure of such electronic assemblies and the placement of such electronic assemblies within the shelf structure of a fiber distribution shelf.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling, wherein only a few feet typically separate each row of frames.

Each optical distribution frame located at the central office typically defines a plurality of vertical bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

In order to maintain the quality and integrity of the fiber administration system, the various optical fibers and connections that make the fiber administration system must be monitored. By using intelligent connection modules, some of the monitoring functions can be performed by the connection modules themselves. Intelligent connection modules contain a microprocessor that run programs containing algorithms that monitor the various optical signals that pass through each connection module. An example of such an intelligent connection module is described in U.S. patent application Ser. No. 08/709,977, entitled OPTICAL MONITORING AND TESTING MODULE, filed Sep. 9, 1996 which is assigned to Lucent Technologies, the assignee herein.

In a fiber administration system, the connection modules are typically mounted in a row that extends across the interior of each fiber distribution shelf. As a result, each fiber distribution shelf may contain over a dozen separate connection modules. Each of these modules contain connector ports so that each connection module can be coupled to the central controller of the overall fiber administration system. In this manner, the microprocessors contained within the connection modules can communicate with central controller of the fiber distribution system.

A problem that exists is that the space available for electrical and optical leads within the confines of a fiber distribution shelf are very small. As such, it is difficult to organize and access the various electrical an optical leads that lead to and from the connection modules within a fiber distribution shelf.

A need therefore exists in the art for device that organizes the electrical leads that extend to and from a row of connection modules in a fiber distribution shelf, wherein the device integrates into the fiber administration system in a space efficient manner in regard to both its physical presence and the flow of leads to and from the device.

A need also exists for a method of connecting electrical leads to a row of connection modules in a fiber distribution shelf in a space efficient manner.

SUMMARY OF THE INVENTION

The present invention is an electrical backplane assembly for interconnecting a plurality of connection modules in a fiber distribution shelf to the central controller of an optical fiber administration system. The electrical backplane assembly contains the circuitry that serves as an interface between the central controller and the individual connection modules on the fiber distribution shelf. The electrical backplane assembly also contains the circuitry that routes power to each of the connection modules from a common power source. The electrical backplane assembly mounts upon a bracket assembly within the confines of the shelf structure of the fiber distribution shelf. The bracket assembly retains the electrical backplane assembly in a small previously unused area of space in between the tops of the connection modules and the interior top panel of the fiber distribution shelf. By having the electrical backplane assembly entirely contained within the shelf structure of a fiber distribution shelf, a unique configuration is provided that greatly reduces the size and complexity of the overall fiber administration system.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
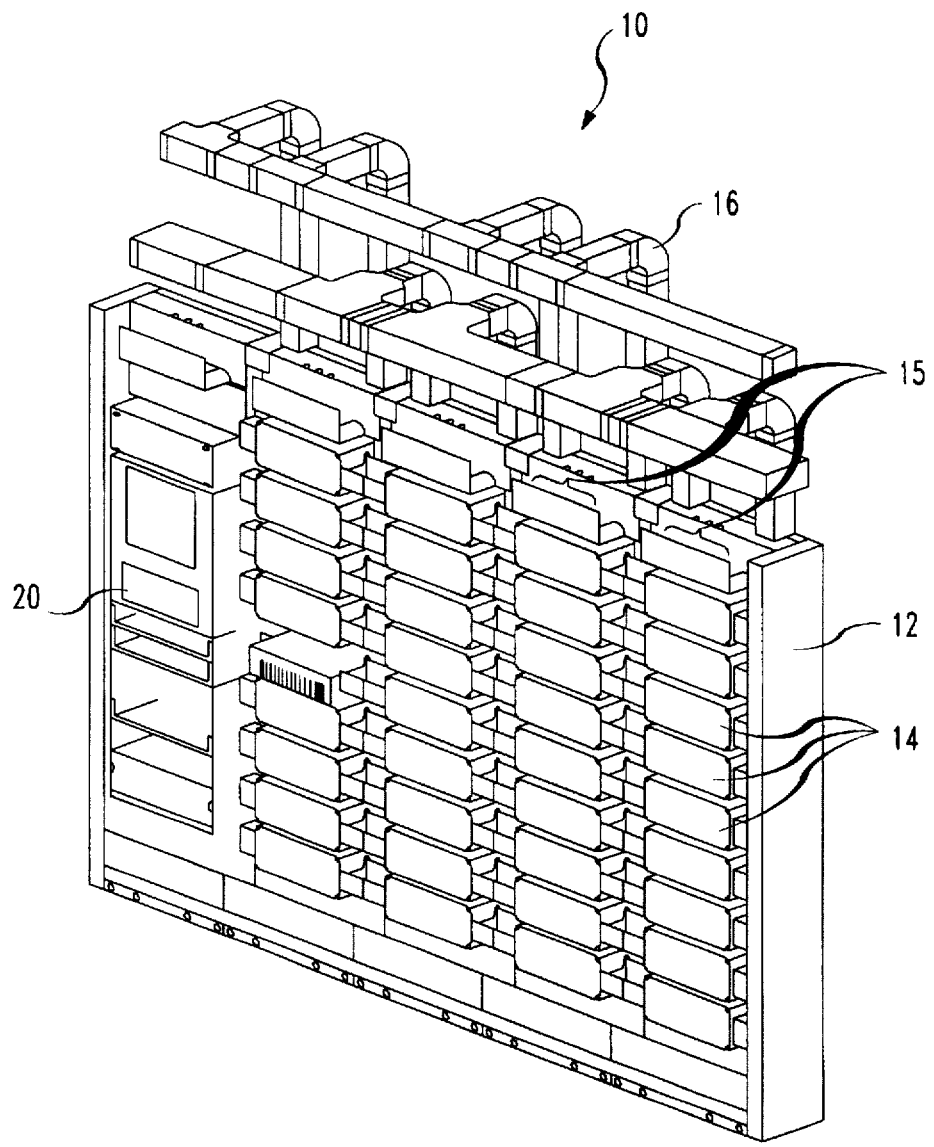
FIG. 1 is a perspective view of an optical fiber administration system containing a first plurality of bays and a second plurality of fiber distribution shelves in each bay.

Referring to FIG. 1, a fiber administration system 10 is shown. Such fiber administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, and U.S. patent application Ser. No. 08/709,978, entitled FIBER OPTIC OPERATION CENTER, filed Sep. 9, 1996. The exemplary fiber administration system 10 illustrated has an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 are commercially available and come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is a central controller 20 that communicates with connection modules (not shown) that are retained within the fiber distribution shelves 14. The control modules are opto-electronic units into which the various optical fibers that lead into the fiber administration system 10 terminate. The connection modules provide connector ports that enable the various optical fibers to be selectively connected to other equipment contained within the fiber administration system. As will be later described, the connector modules also monitor the integrity of the optical signals that pass their structure and relay that information to the central controller 20.

Figure 2:
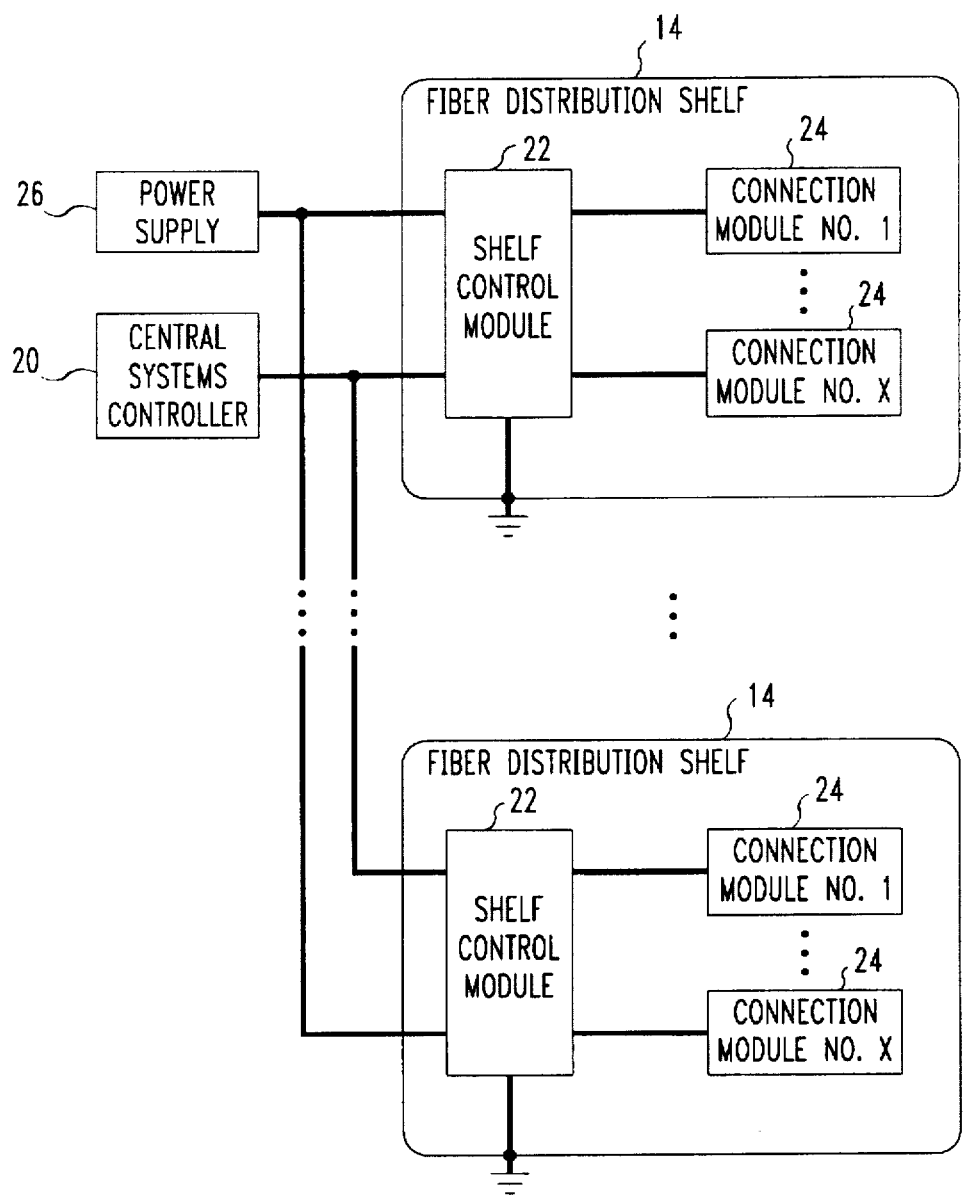
FIG. 2 is block diagram schematic showing the control system architecture of the overall fiber administration system in regard to the control of the individual connection modules.

Referring to FIG. 2, it can be seen that the central controller 20 is coupled to a plurality of shelf control modules 22. A shelf control module 22 exists for every fiber distribution shelf 14 on each bay 15 (FIG. 1) in the framework of the fiber administration system. The shelf control module 22 for each fiber distribution shelf 14 continuously polls the connection modules 24 located on that shelf. If a connection module 24 detects an error or an unacceptable change in the optical signal passing through that connection module 24, then an alarm signal is generated. The alarm signal is read by the shelf control module 22, which acts as an interface with the central controller 20. In the reverse direction, a control signal may be sent to a specific connection module 24 from the central controller 20. In such a scenario, the control signal is first sent to the shelf control module 22, wherein the signal is then directed to the intended connection module 24.

In FIG. 2, it can also be seen that each shelf control module 22 is powered by a common power supply 26. As will be later explained, the shelf control module 22 for any given fiber distribution shelf 14 is grounded to the structure of that fiber distribution shelf 14. As a result, any one shelf control module 22 or fiber distribution shelf 14 can be removed from the overall fiber administration system without effecting the flow of power to the remaining fiber distribution shelves 14. On each of the shelf distribution shelves 14, the individual connection modules 24 receive power via the shelf control module 22. As a result, if any shelf control module 22 is unconnected from the power supply 26 all of the connector modules 24 on that fiber distribution shelf 14 are deactivated. However, any one single connection module 24 can be removed from a fiber distribution shelf 14, without effecting the operation of the remaining connection modules 24 on that shelf.

Figure 3:
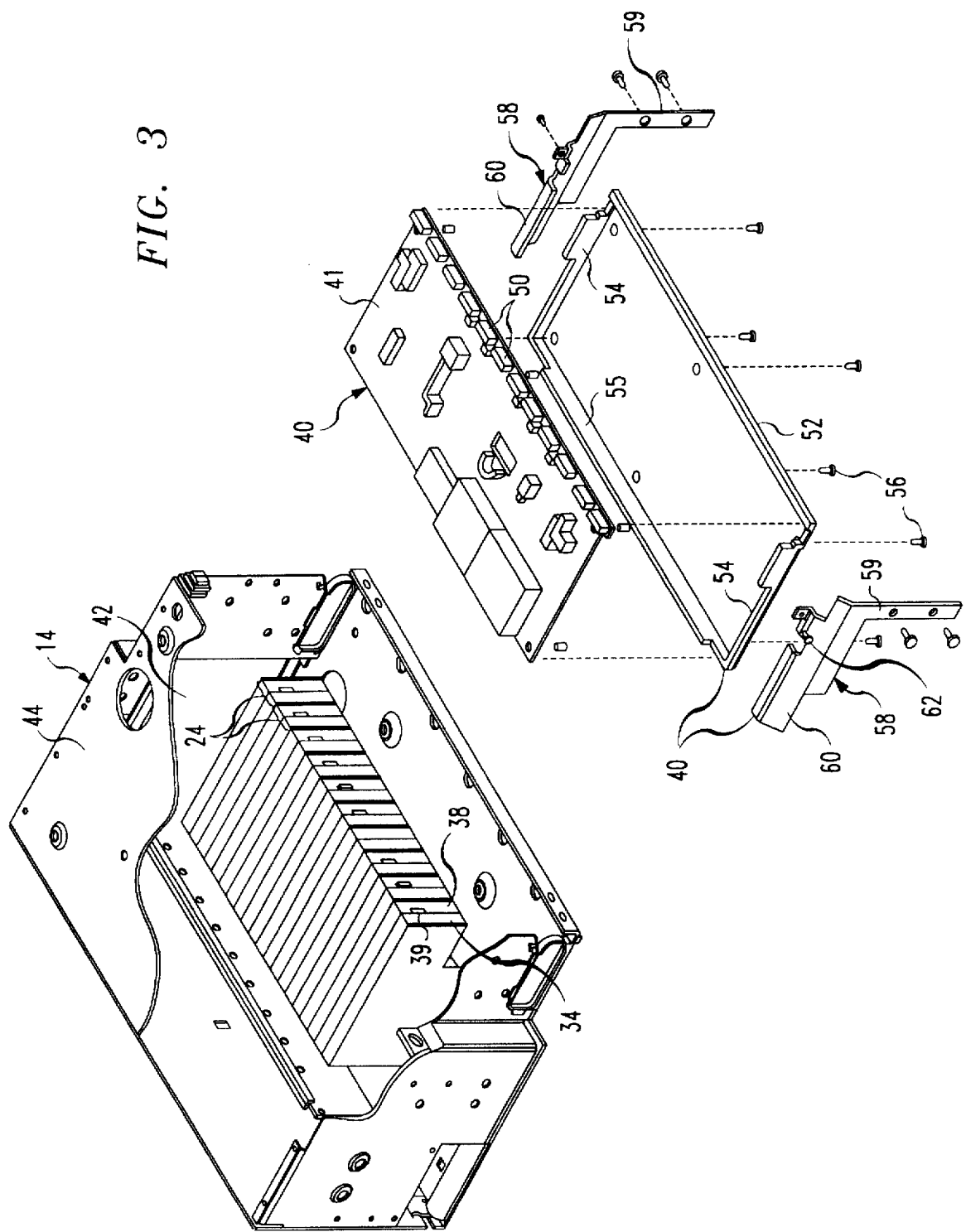
FIG. 3 is an exploded view of an exemplary embodiment of a backplane device in accordance with the present invention, wherein the backplane device is shown in conjunction with a fiber distribution shelf that has been fragmented to illustrate the presence of connection modules within the fiber distribution shelf.

Referring to FIG. 3, the rear of a fiber distribution shelf 14 is shown. The fiber distribution shelf 14 contains a rack of connection modules 24 that receive optical fibers, via connection ports (not shown) that are disposed on the face of the connection modules 24. Although the connection modules 24 can be of any type used in conjunction with fiber administration systems, the connection modules 24 are preferably of the type having separate optical and electronic subassemblies. Such connection modules are described in detail in U.S. patent application Ser. No. 08/709,977, entitled OPTICAL MONITORING AND TESTING MODULE. In such connection modules 24, the module is divided into two detachable subassemblies that include an optical subassembly 34 and an electronic subassembly 38. The optical subassembly 34 contains most all of the optical elements of the overall connection module 24. An optical connection port 36 is disposed on the rear of the optical subassembly 34 that attaches to an optical switch (not shown). The electronic subassembly 38 contains most of the electronic components that make up the overall connection module 24. An electrical connection port 39 is disposed on the electronic subassembly 38. It is the electrical connection port 39 that interconnects with the shelf control module 24 (FIG. 2).

Figure 4:
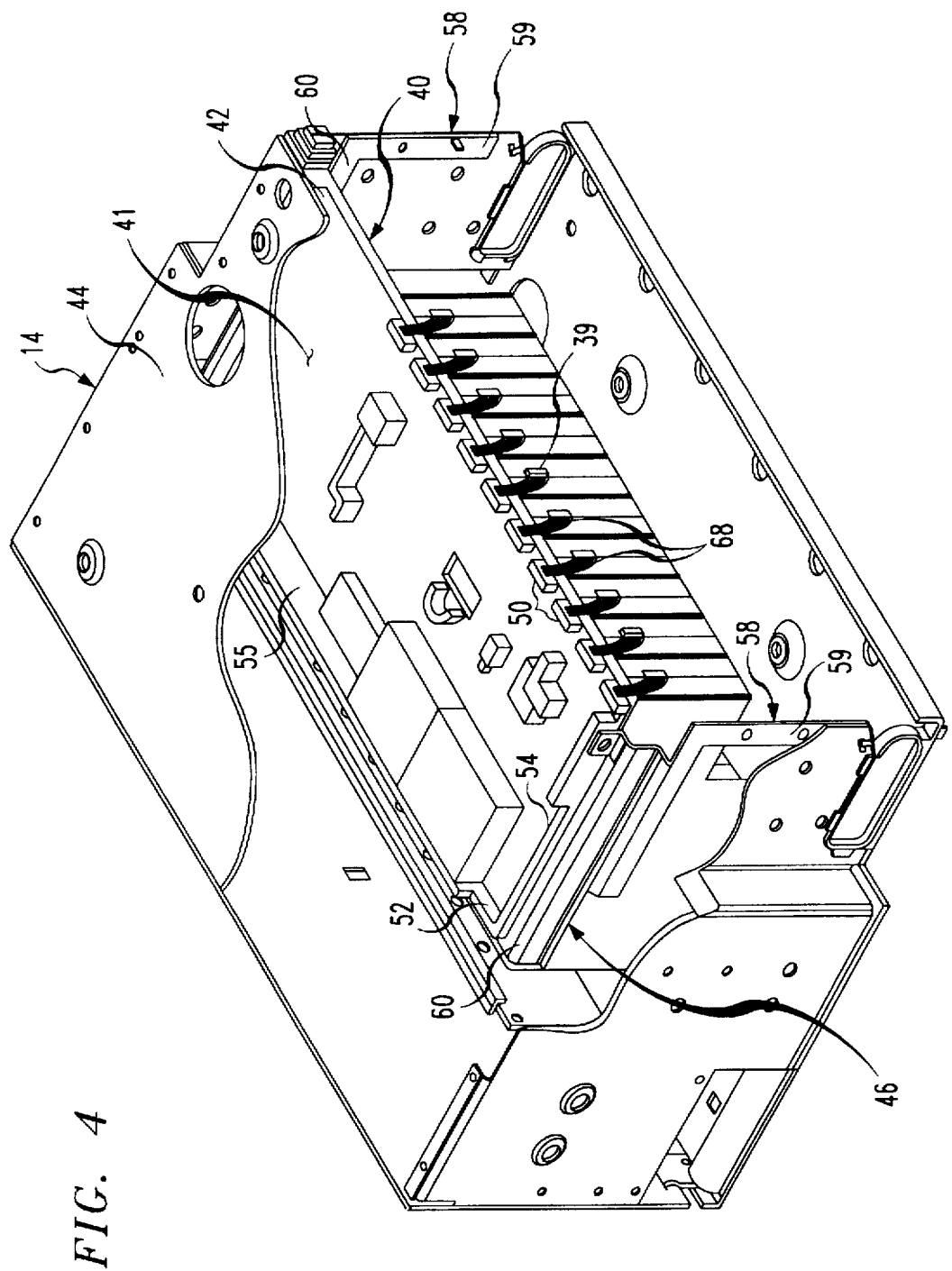
FIG. 4 is an assembled perspective view of the embodiment shown in FIG. 3.

In FIGS. 3 and 4, the electronic components that comprise the shelf control module 24 (FIG. 2) and the power supply circuitry are assembled on a common circuit board 41, referred to in this disclosure as an electrical backplane 40. Referring to FIG. 3 in conjunction with FIG. 4, it can be seen that when the various connection modules 24 are placed within the distribution shelf 14, an open area 42 of unused space exists in between the top of the connection modules 24 and the top panel 44 of the fiber distribution shelf 14. The electrical backplane 40 is joined to a bracket assembly 46 that mounts to the fiber distribution frame 14 and retains the electrical backplane 40 in place within the open area 42 above the connection modules 24.

The electrical backplane 40 and bracket assembly 46 form an overall assembly that is specifically sized to fit within the open area 42 of unused space that exists in between the connection modules 24 and the top panel 42 of the fiber distribution shelf 14. The circuitry contained within the electrical backplane 40 is accessible through a plurality of connector ports 50 that are present on the rear edge of the circuit board 41. A connector port 50 exists for each connection module 24 present in the fiber distribution shelf 14.

The circuit board 41 of electrical backplane 40 is held in a horizontal plane above the connection modules 24 by the bracket assembly 46. The bracket assembly 46 is preferably made of a conductive material so that the structure of the bracket assembly 46 is electrically grounded to the structure of the fiber distribution shelf 14 when assembled thereto. The bracket assembly 46 itself can therefore serve as an electrical ground to the electrical backplane 40, thereby eliminating the need for a separate ground lead.

The bracket assembly 46 includes a tray structure 52 that is sized to receive the circuit board 41 of the electrical backplane 40. The tray structure 52 has two side walls 54 and a rear wall 55 that abut against the circuit board 41 of the backplane 40 and help to hold it in place. Mounting screws 56 (FIG. 3) affix the circuit board 41 to the tray structure 52 and provide ground connections between the tray structure 52 and the electrical backplane 40. L-shaped side brackets 58 are provided to interconnect the tray structure 52 to the fiber distribution shelf 14. The side brackets 58 contain vertical elements 59 that connect directly to the fiber distribution shelf 14 with screws. As such, the side brackets 58 are rigidly affixed to structure of the fiber distribution shelf 14. However, the horizontal elements 60 of the side brackets 58 define sliding tracks that engage the side walls 54 of the tray structure 52. As a result, the tray structure 52 can be selectively removed from the fiber distribution shelf 14 without having to remove the side brackets 58. An anchor screw 62 (FIG. 3) is provided to rigidly affix the side brackets 58 to the tray structure 52. The anchor screw 62 is added when it is desired to set the tray structure 52 in place. Conversely, the anchor screw 62 is removed when the tray structure 52 and the electrical backplane 40 it supports is to be removed.

The overall bracket assembly 46 retains the electrical backplane 40 entirely within the confines of the open area 42 in between the connection modules 24 and the top panel 44 of the fiber distribution shelf 14. Once set into position, short connector ribbons 68 (FIG. 4) are used to interconnect the connector ports 39 on the electrical backplane 40 to the electrical ports 50 on the rear of the connection modules 24. Since the electrical backplane 40 mounts within the confines of the fiber distribution shelf 14, the no additional space in the fiber administration system framework needs to be made for the circuitry contained within the electrical backplane 40. Furthermore, since the electrical backplane 40 mounts close to the rear of the connection modules 24 within a fiber distribution shelf 14, the connector ribbons 68 that extend between the connection modules 24 and the electrical backplane 40 can be made very short in length. As a result, the previously unused space available on a fiber distribution shelf 14 is utilized in a manner that greatly simplifies the electrical lead architecture since optical leads to and from remote circuitry need not be used.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. In an optical fiber administration system having a plurality of fiber distribution shelf assemblies and a central systems controller, a fiber distribution shelf assembly, comprising:
   a shelf structure defining a confined space;
   a plurality of connection modules supported by said shelf structure within said confined space, wherein each of said connection modules is capable of being controlled by the systems controller;
   an electrical backplane device mounted to said shelf structure within said confined space, wherein said electrical backplane couples to the systems controller; and
   a plurality of leads electrically coupling said connection modules to said electrical backplane within said confined space, wherein said systems controller and said plurality of connection modules intercommunicate with each other through said electrical backplane assembly.

2. The assembly according to claim 1, further including a bracket assembly, wherein said bracket assembly mounts to said shelf structure within said confined space and supports said electrical backplane device within said confined space.

3. The assembly according to claim 1, wherein said shelf structure has a top surface and said electrical backplane device is disposed between said top surface and said plurality of connection modules within said confined space of said shelf structure.

4. The assembly according to claim 2, wherein said electrical backplane device is contained on a circuit board and said bracket assembly supports said circuit board in a substantially horizontal plane above said connection modules in said confined space of said shelf structure.

5. The assembly according to claim 2, wherein said bracket assembly includes a tray adapted to receive said circuit board and mounting brackets that mount to said shelf structure, wherein said tray can be selectively joined to said mounting brackets within said confined space of said shelf structure.

6. The assembly according to claim 1, wherein said electrical backplane device includes a plurality of electrical connectors wherein each of said connector modules is coupled to a corresponding one of said electrical connectors with one of said electrical leads.

7. The assembly according to claim 2, wherein said bracket assembly is electrically grounded to said shelf structure.

8. An optical fiber administration system comprising:
   a systems controller;
   a plurality of fiber distribution shelves;
   a plurality of connection modules on each of said fiber distribution shelves;
   an electrical backplane assembly disposed within each of said plurality of fiber distribution shelves, said electrical backplane being electrically coupled to said systems controller and each of said plurality of connection modules contained within the same fiber distribution shelf, wherein said systems controller and said plurality of connection modules intercommunicate with each other through said electrical backplane assembly.

9. The system according to claim 8, further including an central power supply coupled to each said electrical backplane assembly, wherein each of said plurality of connection modules receive power from said central power supply through said electrical backplane assembly.

10. The system according to claim 8, wherein said electrical backplane assembly includes a plurality of electrical connectors wherein each of said plurality of connector modules on a fiber distribution shelf is coupled to a corresponding one of said electrical connectors with a separate electrical lead.

11. The system according to claim 8, wherein each of said fiber distribution shelves include a shelf structure defining a confined space, wherein said connection modules are supported by said shelf structure within said confined space, and each said electrical backplane assembly is coupled to said connection modules within said confined space.

12. The system according to claim 11, further including a bracket assembly, wherein said bracket assembly mounts to said shelf structure within said confined space and supports said electrical backplane assembly within said confined space.

13. The system according to claim 11, wherein said shelf structure has a top surface and said electrical backplane assembly is disposed between said top surface and said plurality of connection modules within said confined space of said shelf structure.

14. The system according to claim 12, wherein said electrical backplane assembly is contained on a circuit board and said bracket assembly supports said circuit board in a substantially horizontal plane above said plurality of connection modules in said confined space of said shelf structure.

15. The system according to claim 12, wherein said bracket assembly includes a tray adapted to receive said circuit board and mounting brackets that mount to said shelf structure, wherein said tray can be selectively joined to said mounting brackets within said confined space of said shelf structure.

16. The system according to claim 12, wherein said electrical backplane assembly is grounded to said shelf structure of said fiber distribution shelf to which said electrical backplane is attached.

17. In an optical fiber distribution shelf containing a plurality of connection modules disposed within a shelf structure, the method of electrically interconnecting a systems controller to said connection modules, comprising the steps of:

mounting an systems interface module to said shelf structure, wherein said systems interface module is contained entirely within said shelf structure;

joining said systems interface module to each of said connection modules within said shelf structure with a separate lead wherein each said lead is contained entirely within said shelf structure; and joining said systems controller to said systems interface modules, wherein said systems interface module enables intercommunication between said connection modules and said systems controller.

18. The method according to claim 17, wherein said step of mounting a systems interface module includes affixing said systems interface module to a bracket that retains said shelf structure above said connection modules within said shelf structure.

19. The method according to claim 17, wherein said step of mounting a systems interface module to said shelf structure includes affixing said systems interface module to a bracket assembly and mechanically joining said bracket assembly to said shelf structure.

20. The method according to claim 19 further including the step of grounding said systems interface module to said bracket assembly.

* * * * *